(12) United States Patent
Morimoto et al.

(10) Patent No.: US 8,037,209 B2
(45) Date of Patent: Oct. 11, 2011

(54) DEVICE CONFIGURATION INTEGRATION INFORMATION MANAGING DEVICE AND DEVICE CONFIGURATION INFORMATION MANAGING DEVICE

(75) Inventors: Kenji Morimoto, Bunkyo (JP); Yuji Wada, Kawasaki (JP); Masazumi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/805,456

(22) Filed: Jul. 30, 2010

(65) Prior Publication Data
US 2011/0035512 A1 Feb. 10, 2011

Related U.S. Application Data

(63) Continuation of application No. PCT/JP2008/051576, filed on Jan. 31, 2008.

(51) Int. Cl.
*G11B 27/00* (2006.01)
(52) U.S. Cl. ............................. 710/1; 707/803
(58) Field of Classification Search .................. None
See application file for complete search history.

(56) References Cited

U.S. PATENT DOCUMENTS

| | | | |
|---|---|---|---|
| 6,286,044 B1 | 9/2001 | Aoyama | |
| 7,822,785 B2* | 10/2010 | Ayachitula et al. | 707/804 |
| 7,885,943 B1* | 2/2011 | Yehuda et al. | 707/694 |
| 7,886,028 B2* | 2/2011 | Kogoh | 709/220 |
| 7,926,031 B2* | 4/2011 | Faihe et al. | 717/121 |
| 2006/0161444 A1* | 7/2006 | Lubrecht et al. | 705/1 |
| 2006/0225032 A1* | 10/2006 | Klerk et al. | 717/105 |
| 2007/0274224 A1 | 11/2007 | Suzuki et al. | |
| 2009/0106459 A1* | 4/2009 | Abels et al. | 710/10 |

FOREIGN PATENT DOCUMENTS

| | | |
|---|---|---|
| JP | 9-91122 | 4/1997 |
| JP | 2000-13868 | 1/2000 |
| JP | 2007-318288 | 12/2007 |

OTHER PUBLICATIONS

CMDB, CMDB Federation, Oct. 2007, CMDB, pp. 1-84.*
Decision of a Patent Grant, mailed Mar. 22, 2011, in corresponding Japanese Application No. 2009-551379 (3 pp.).
Internet "CMDB Federation (CMDBf)", Committee Draft Version 1.0, CMDB Federation Working Group, 84 pages, searched on Jan. 23, 2008, http://cmdbf.org/schema/1-0-0/CMDBf%20v1.0.pdf.
Internet "CMBD Federation (CMDBf)", Committee Draft Version 1.0, CMBD Federation Working Group, 84 pp., searched on Jan. 23, 2008, http://cmdbford/schema/1-0-0/CMDBf%20v1.0.pdf.

* cited by examiner

*Primary Examiner* — Cheng-Yuan Tseng
(74) *Attorney, Agent, or Firm* — Staas & Halsey LLP

(57) ABSTRACT

MW of an FCMDB sequentially registers device configuration information of MDRs 1 and 2 in the FCMDB. The MW registers the device configuration information of the MDR 2 in the FCMDB, including a process policy indicating that "at a class lower than or equal to a Server class, an unknown component is added to last of device configuration integration information", which is provided by the MDR 2 as a process policy in a case where the device configuration information of the MDR 2 is read. An MW 2 reconstructs the device configuration information of the MDR 2, according to order information of metadata of the device configuration information of the MDR 2 and a predetermined process policy indicating that "at a class not higher than a Server class, an unknown component is added to last of device configuration integration information", as a process policy to reconstruct the device configuration information.

22 Claims, 10 Drawing Sheets

FIG.3

| DATA CLASS | DATA ID | ATTRIBUTE INFORMATION |
|---|---|---|
| Server | Server_Bravo_A | name="A", model="Bravo" |
| CPU | CPU_Bravo_A_Charlie_1 | name="1", model="Charlie", socket="1", frequency="5.0 GHz" |
| CPU | CPU_Bravo_A_Charlie_2 | name="2", model="Charlie", socket="2", frequency="5.0 GHz" |
| CPU | CPU_Bravo_A_Charlie_3 | name="3", model="Charlie", socket="3", frequency="3.0 GHz" |

```
<Server name="A" model="Bravo" id="Server_Bravo_A">
  <CPU name="1" model="Charlie" socket="1"
    id="CPU_Bravo_A_Charlie_1" frequency="5.0 GHz"/>
  <CPU name="2" model="Charlie" socket="2"
    id="CPU_Bravo_A_Charlie_2" frequency="5.0 GHz"/>
  <CPU name="3" model="Charlie" socket="3"
    id="CPU_Bravo_A_Charlie_3" frequency="3.0 GHz"/>
</Server>
```

| DATA ID | DEVICE CONFIGURATION INFORMATION REGISTRATION SOURCE |
|---|---|
| Server_Bravo_A | MDR 1 |
| CPU_Bravo_A_Charlie_1 | MDR 1 |
| CPU_Bravo_A_Charlie_2 | MDR 1 |
| CPU_Bravo_A_Charlie_3 | MDR 1 |

| DEVICE CONFIGURATION INFORMATION REGISTRATION SOURCE | DATA A | DATA B | RELATIONSHIP OF A TO B |
|---|---|---|---|
| MDR 1 | SERVER A | CPU 1 | CHILD |
| MDR 1 | SERVER A | CPU 2 | CHILD |
| MDR 1 | SERVER A | CPU 3 | CHILD |
| MDR 1 | CPU 1 | CPU 2 | BROTHER |
| MDR 1 | CPU 2 | CPU 3 | BROTHER |
| MDR 2 | SERVER A | CPU 1 | CHILD |
| MDR 2 | SERVER A | CPU 2 | CHILD |
| MDR 2 | CPU 2 | CPU 1 | BROTHER |

| PROCESS POLICY REGISTRATION SOURCE | DATA POSITION | PROCESS POLICY |
|---|---|---|
| MDR 1 | RIGHT BELOW SERVER A | MAINTAIN RELATIONSHIP WITH RIGHT BEFORE DATA |
| MDR 2 | EQUAL TO OR LOWER THAN SERVER CLASS | ADD TO LAST |

| PROCESS POLICY REGISTRATION SOURCE | DATA POSITION | PROCESS POLICY |
|---|---|---|
| MDR 1 | RIGHT BELOW SERVER A | DISCARDING |
| MDR 2 | EQUAL TO OR LOWER THAN SERVER CLASS | REQUEST INVERSE CONVERSION TO DEVICE CONFIGURATION INFORMATION REGISTRATION SOURCE |

US 8,037,209 B2

DEVICE CONFIGURATION INTEGRATION INFORMATION MANAGING DEVICE AND DEVICE CONFIGURATION INFORMATION MANAGING DEVICE

CROSS-REFERENCE TO RELATED APPLICATION

This application is a continuation of International Application No. PCT/JP2008/051576, filed on Jan. 31, 2008, the entire contents of which are incorporated herein by reference.

FIELD

An embodiment discussed herein is directed to a device configuration integration information managing device and a device configuration information managing device that acquire pieces of device configuration information in hierarchical structure from a plurality of device configuration information managing devices.

BACKGROUND

In recent years, in a field of system operation and management, a document where the know-how about success cases is accumulated, which is called ITIL (Information Technology Infrastructure Library; registered trademark), has been widely used. The ITIL is published by CCTA (Central Computer and Telecommunications Agency), which is a British government agency, in 1989 and becomes a de facto international standard in the field of system operation and management at the present time.

For example, as disclosed in Non-Patent Document 1, CMDB (Configuration Management Database) is proposed as a standard to manage pieces of device configuration information in a system. The CMDB is a device configuration information database that is defined in the ITIL.

According to the CMDB, in order to manage the pieces of device configuration information in the system, a device configuration information database is constructed as a database to manage the pieces of device configuration information in the system and a relationship between the pieces of device configuration information. In the device configuration of the system, various components such as a variety of hardware, a software, and a variety of data are included. In this case, how to efficiently and easily configure the device configuration information database has to be considered.

Accordingly, in Patent Document 1, a software configuration managing mechanism that provides a unit for automatically customizing a unit for providing metadata of device configuration information databases to people who register various devices so as to enable easy construction of the device configuration information database and easy change of a device configuration management target is disclosed.

Specifically, a configuration schema registering unit generates a schema of a device configuration information database and metadata for access. A resource configuration information access unit allows a person accessing to the pieces of device configuration information to read, add, update, and delete data of a customized schema type. A configuration information display/maintenance unit collects data from the device configuration information database and integrates metadata as logical resources with the device configuration information database at a higher hierarchy than the metadata.

The device configuration information database at the higher hierarchy, which is called an FCMDB (Federated CMDB), is a database for integrated management of a plurality of pieces of device configuration information. Implementation of a database for each piece of the device configuration information is called an MDR (Management Data Repository).

However, the related art such as "CMDB Federation (CMDBf)", Committee Draft Version 1.0, [online], Oct. 22, 2007, CMDB Federation Working Group, [searched on Jan. 23, 2008], Internet <URL: http://cmdbf.org/schema/1-0-0/CMDBf%20v1.0.pdf> and Japanese Laid-open Patent Publication No. 09-91122 has the following problems. In integrated management, by the FCMDB, of pieces of device configuration information of respective MDRs in a system, the FCMDB uses a common data model, but the data formats of respective MDRs are not unified. For example, schema may be different, data order may be different even when a common schema is used, or although data that is read from the MDR has a hierarchical structure and a parent-child relationship, the hierarchical structure and the parent-child relationship are not stored in the common data model.

For this reason, the pieces of device configuration information that are read from the MDR may be in different order and the parent-child relationship is not stored in the common data model, and a device that reads the device configuration information from the FCMDB in the format of the MDR cannot express a portion of the pieces of device configuration information included in a schema of the common data model. Therefore, there has been a disadvantage that the pieces of device configuration information that are integrated in the common data model are discrepant with the pieces of device configuration information of respective components before integration.

SUMMARY

According to an aspect of an embodiment of the invention, a device configuration integration information managing device is to acquire pieces of device configuration information having a hierarchical structure and including components of devices managed by a plurality of device configuration information managing devices and a relationship between the components from the plural device configuration information managing devices, integrate the pieces of device configuration information into device configuration integration information, and manage the device configuration integration information. The device configuration integration information managing device includes a device configuration integration information storing and managing unit that stores and manages the device configuration integration information; a meta-information storing and managing unit that stores and manages the plurality of pieces of device configuration information and meta-information of the device configuration integration information; a device configuration information acquiring and registering unit that acquires the device configuration information having an expression format converted into that of the device configuration integration information and registers the pieces of device configuration information in the device configuration integration information storing and managing unit, based on the meta-information of the device configuration integration information stored and managed by the meta-information storing and managing unit; and a meta-information registering unit that acquires a pieces of registration source meta-information and a piece of document structure meta-information of each of the pieces of device configuration information where the expression format thereof is converted and a piece of document structure meta-information of the device configuration information before the expression format is converted and registers the pieces of information in the meta-information storing and managing unit.

According to another aspect of an embodiment of the invention, a device configuration information managing device is to manage pieces of device configuration information having a hierarchical structure and including components of devices as device configuration information management targets and a relationship between the components, being integrated into device configuration integration information and managed in a device configuration integration information managing device. The device configuration information managing device includes an expression format conversion unit that converts the expression format of each of the pieces of device configuration information into the expression format of the device configuration integration information in the device configuration integration information managing device and transmits the pieces of information to the device configuration integration information managing device; and an expression format inverse conversion unit that inversely converts the expression format of the device configuration integration information received from the device configuration integration information managing device into the expression format of each of pieces of the device configuration information in each of the device configuration information managing devices, and transmits the information to the device configuration integration information managing device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates an example of a device configuration integration information data table according to the embodiment;

FIG. 4 illustrates an expression of device configuration integration information data according to the embodiment;

FIG. 5 illustrates an example of a device configuration information registration source meta-information table according to the embodiment;

FIG. 6 illustrates an example of a document structure meta-information table according to the embodiment;

FIG. 7 illustrates an example of a document structure process policy meta-information table according to the embodiment;

FIG. 8 illustrates an example of a different schema process policy meta-information table according to the embodiment;

DESCRIPTION OF EMBODIMENTS

A preferred embodiment of the present invention will be explained with reference to accompanying drawings. In the following embodiment, an MDR is managed by a device configuration information managing device and has a piece of device configuration information of a device as a device configuration information management target. An FCMDB for integration management of pieces of the device configuration information of respective MDRs is managed by the device configuration integration information managing device and has device configuration integration information obtained by integrating the pieces of the device configuration information of respective MDRs.

The MDRs are managed by a DBMS (Database Management System), which is a middleware (hereinafter, simply referred to as MW) running on the device configuration information managing device. The FCMDB is managed by the DBMS, which is an MW running on the device configuration integration information managing device.

In the following embodiment, one device configuration integration information managing device acquires pieces of device configuration information from two device configuration information managing devices and manages the pieces of information as device configuration integration information. However, the number of pieces of the device configuration integration information managing device and the number of the device configuration information managing devices are not limited thereto.

In the following embodiment, a "document" indicates "device configuration information" and "data" indicates a "component" constituting a system or a device such as a hardware or a software.

Before describing the device configuration integration information managing program and the device configuration integration information managing device according to the embodiment, disadvantages of a device configuration integration information managing program and a device configuration integration information managing device according to the related art will be first described.

First, a (first) disadvantage according to the related art will be described with reference to FIG. 12A. The FCMDB handles data based on a common data model. However, even though a schema of each MDR is common, the data formats are not unified (for example, a common schema is used but data order is different, or a parent-child relationship is not stored in data read by the MW), and thus an order or a parent-child relationship of data is lost. Therefore, there have been disadvantages such that collation with original data of each MDR is disabled, and the meaning indicated by data relationships is lost. As a result, the data cannot be reconstructed as a series of data.

Figure 12A:
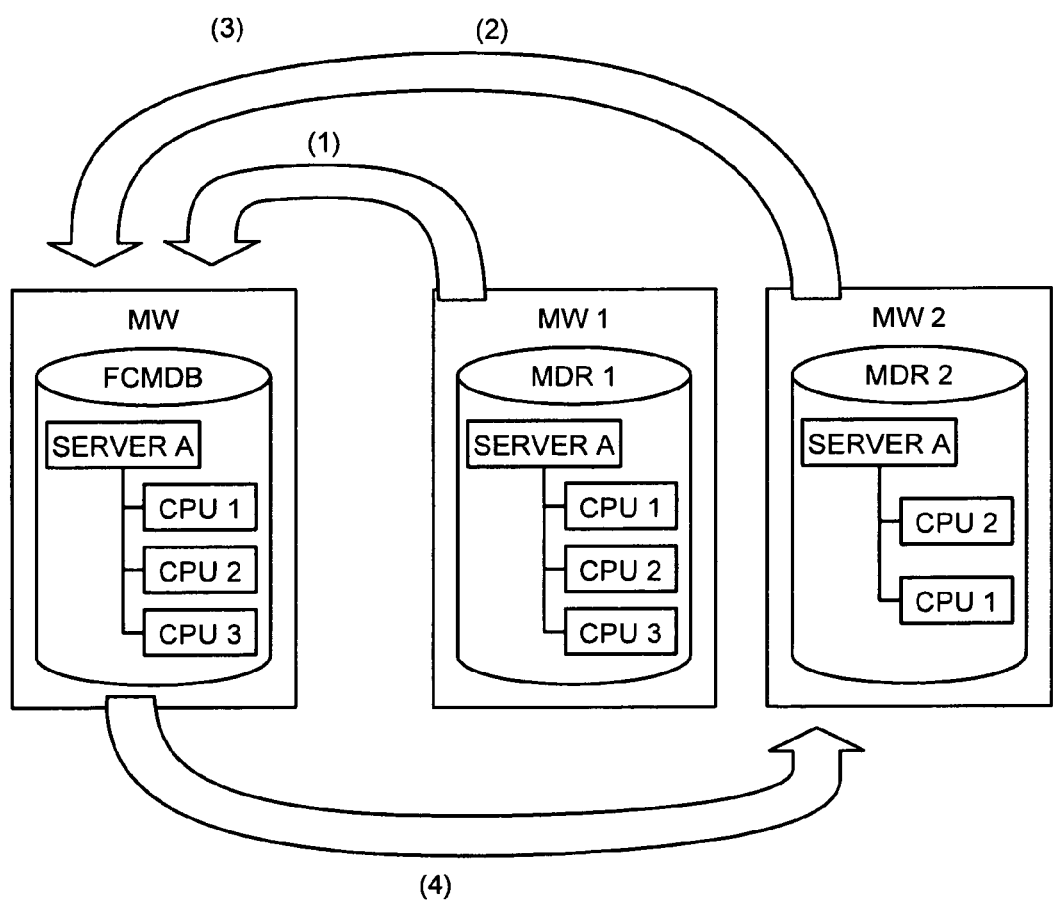
FIG. 12A illustrates a problem according to the related art.

Specifically, in FIG. 12A, (1) the MW of the FCMDB registers a piece of device configuration information of an MDR 1 managed by an MW 1 on the FCMDB. As illustrated in FIG. 12A, the piece of device configuration information of the MDR 1 is a piece of device configuration information indicating that "Server (server) A has components in order of CPU (Central Processing Unit) 1, CPU 2, and CPU 3".

(2) Next, the MW registers a piece of device configuration information of an MDR 2 managed by an MW 2 on the FCMDB. As illustrated in FIG. 12A, the device configuration of the MDR 2 is a piece of device configuration information indicating that "Server A has components in order of CPU 2 and CPU 1".

In this case, the piece of device configuration information indicating that "Server A has components in order of CPU 2 and CPU 1" is included in the piece of device configuration information indicating that "Server A has components in order of CPU 1, CPU 2, and CPU 3", while excluding "order of CPU 1 and CPU 2".

(3) Accordingly, the MW of the FCMDB, which detects components overlapping with the registered data based on IDs or attribute information of the components included in the previously registered device configuration integration information, does not register the piece of device configuration information of the MDR 2.

(4) However, when the MW 2 managing the MDR 2 reads the device configuration integration information from the FCMDB, the piece of device configuration information of the MDR 2 is included, but its order of the data is different such as "order of CPU 1 and CPU 2" because the piece of device configuration information of the MDR 1 is first registered. This situation appears to the MW 2 as if the data is destroyed, so that the MW 2 cannot use the device configuration information of the FCMDB.

More specifically, for example, the MDR 1 stores a plurality of pieces of CPU information of the Server A in order of socket positions. On the other hand, the MDR 2 stores a plurality of pieces of CPU information of the Server A in order detected by a software. In such a case, the two pieces of CPU information are in different orders, but can be same when rearranged.

Accordingly, since the FCMDB stores the piece of device configuration integration information in order of the first registered MDR 1, there has been a disadvantage that latest device configuration integration information of the FCMDB does not completely match with the piece of device configuration information stored in the MDR 2, when compared by the MW 2 managing the MDR 2.

In the MDR, the piece of device configuration information of the Server A also includes information of software that is installed in the Server A. However, in the common data model of the FCMDB, hardware information and software information are separated from each other. As a result, in the FCMDB, as one of a relationship between the components, information indicating that "software is installed/not installed" is stored, which does not correspond to a structure of a parent-child relationship between the components in the MDR.

Accordingly, by referring to the device configuration integration information of the Server A, it can be seen that the software information exists as a component, but the parent-child relationship of the pieces of hardware information and the pieces of software information is not restored. Therefore, it has not been possible to comply with a request to enable to know the information of the installed software with the parent-child relationship maintained by referring to the device configuration integration information of the Server A.

Next, another (second) disadvantage according to the related art will be described with reference to FIG. 12B. The FCMDB handles data based on a common data model, but a schema of each MDR may be different. For this reason, even though the device configuration integration information of the FCMDB is referred to based on a schema of a certain MDR, information that is not included in the schema of the MDR cannot be expressed, and thus data that is included in the FCMDB cannot be effectively used.

Accordingly, it has not been possible to comply with a request to "display information that is not included in the schema of the MDR if exist, so that a person can view the information and determine the meaning thereof" or a demand of "viewing the contents of the FCMDB according to a data structure of the schema of the MDR as much as possible, instead of viewing the contents as they are, when the person views the contents".

Figure 12B:
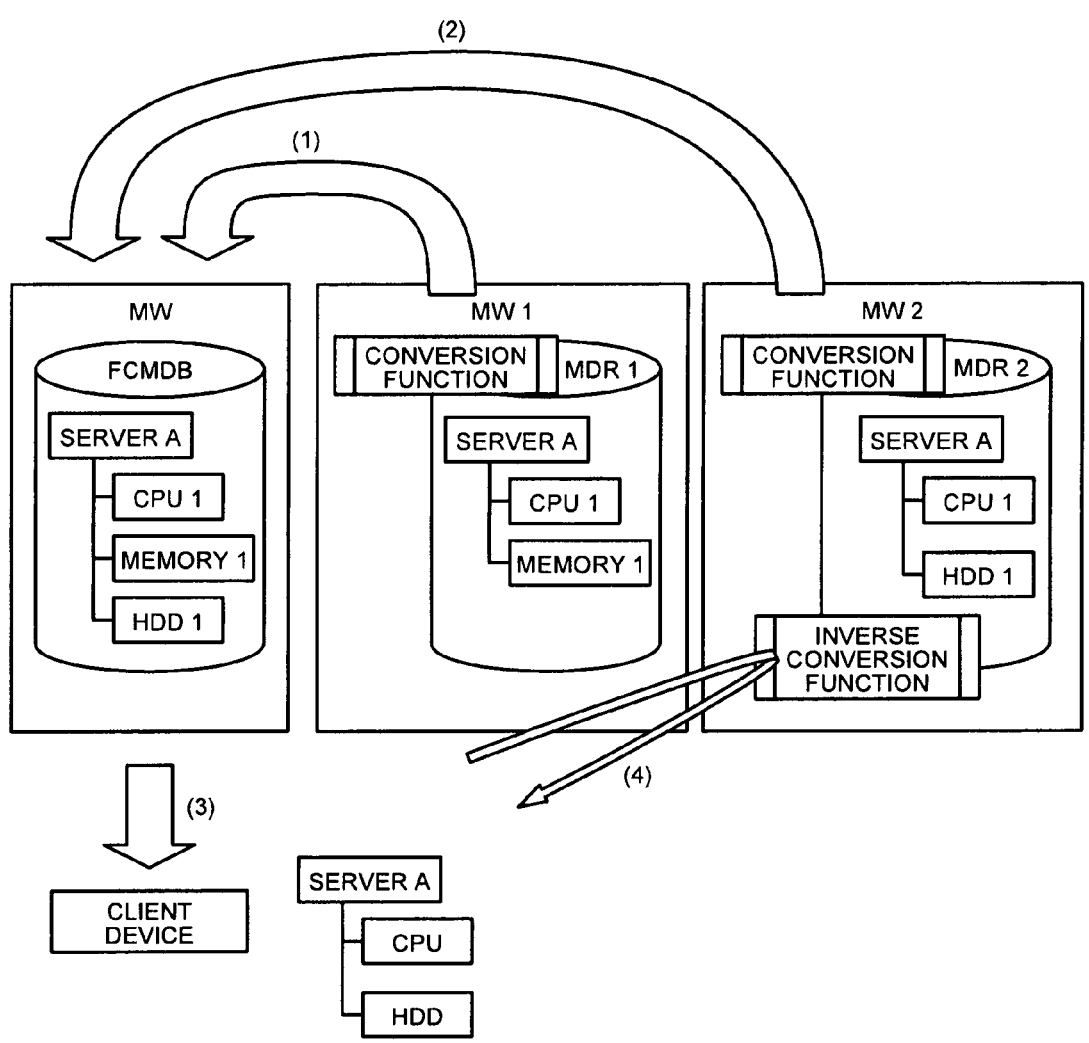
FIG. 12B illustrates another problem according to the related art.

Specifically, in FIG. 12B, (1) the MW of the FCMDB registers the information of the MDR 1 managed by the MW 1 on the FCMDB. As illustrated in FIG. 12B, the piece of device configuration information of the MDR 1 is a piece of device configuration information indicating that "Server A has components in order of CPU 1 and Memory (memory) 1". The MW 1 managing the MDR 1 uses a conversion function to convert the piece of device configuration information so as to adapt to the schema of the FCMDB and transmits the piece of device configuration information to the MW of the FCMDB.

(2) Next, the MW registers the piece of device configuration information of the MDR 2 managed by the MW 2 on the FCMDB. As illustrated in FIG. 12B, the piece of device configuration information of the MDR 2 is a piece of device configuration information indicating that "Server A has components in order of CPU 1 and HDD (Hard Disk Drive) 1". The MW 2 managing the MDR 2 uses a conversion function to convert the piece of device configuration information so as to adapt to the schema of the FCMDB and transmits the piece of device configuration information to the MW of the FCMDB.

In this case, since the MW of the FCMDB detects components overlapping with the registered data based on IDs or attribute information of the components included in the previously registered device configuration integration information, the MW does not register the components of the MDR 2 including the "CPU 1" and registers only the component: "HDD 1".

(3) When a client device refers to the device configuration integration information stored in the FCMDB according to the schema of the MDR 2, the MW managing the FCMDB requests the MW 2 managing the MDR 2 to convert the schema. (4) An inverse conversion function of the MDR 2 converts the device configuration integration information of the FCMDB so as to adapt to the schema of the MDR 2.

In this case, since the schema of the MDR 2 does not include an expression of memory information, the schema cannot express the memory. Accordingly, the memory cannot be referred at all even though the memory is information associated with the Server A.

Specifically, the MDR 2 has information of the CPU and the HDD of the Server A, but does not have the information of the memory. On the other hand, the FCMDB has the information of the memory that is registered by the MDR 1. For this reason, a GUI (Graphical User Interface) that handling data in the same format as that of the MDR 2 cannot use the information of the memory.

Therefore, it is not possible to comply with a request from a user to display the information on the GUI even though the information cannot be recognized as the memory information. Anyway, the memory information may become erroneous and not be correctly returned.

In the following embodiment, a device configuration integration information managing program and a device configuration integration information managing device provided to overcome the above disadvantages are exemplified. In the following embodiment, the MWs managing respective MDRs and the MW managing the FCMDB run on respective different computers. However, the embodiment is not limited thereto and the MWs managing respective MDRs and/or the MW managing the FCMDB may run on the same computer.

Each of the MWs managing the MDRs divides components corresponding to device configuration information collection target devices into management units and collects pieces of device configuration information for the respective management units. Accordingly, the same device configuration information collection target device may be included in different management units.

Figure 1A:
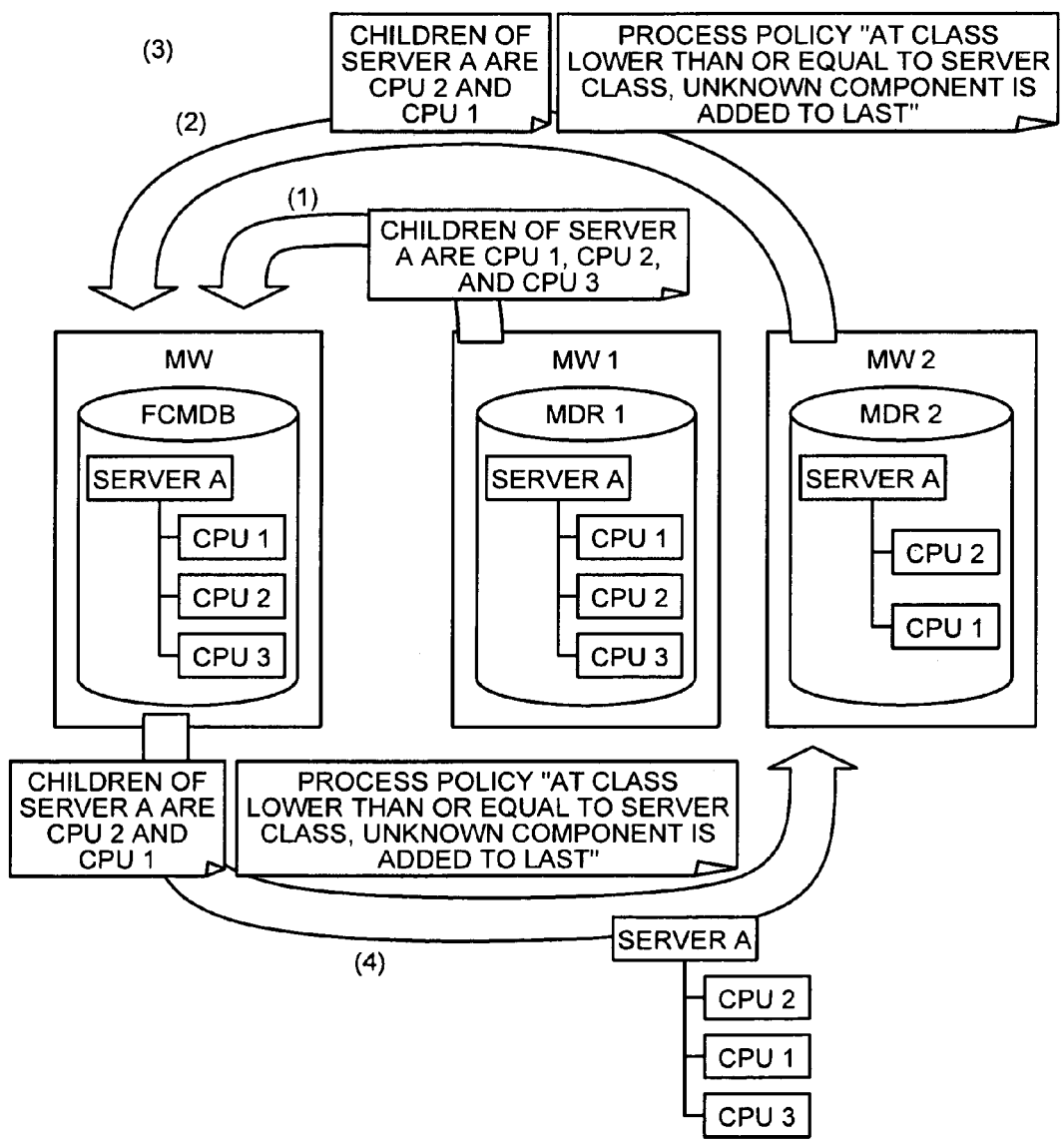
FIG. 1A illustrates an (a first) outline of an embodiment.
Figure 1B:
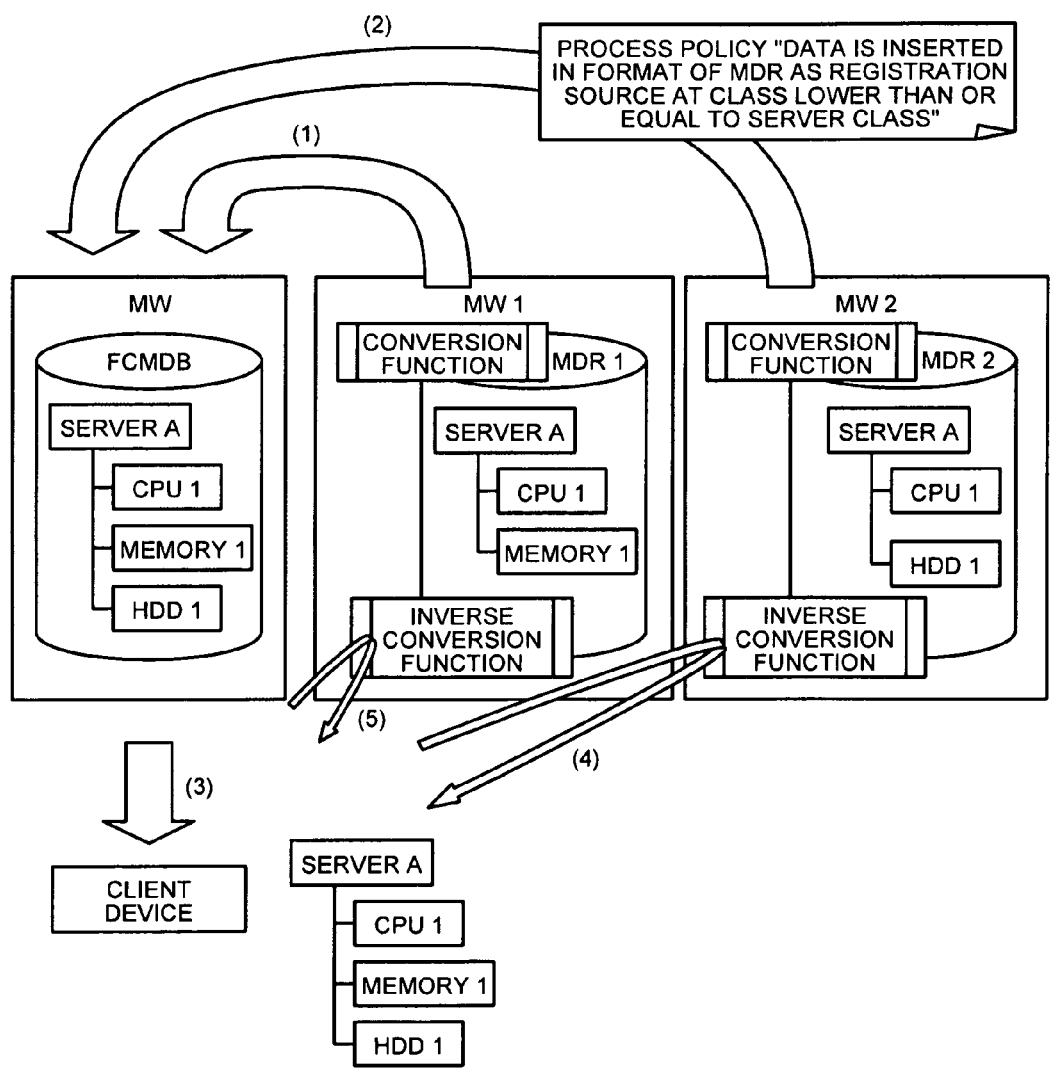
FIG. 1B illustrates an (a second) outline of the embodiment.

First, the outline of an embodiment will be described. FIG. 1A illustrates an (a first) outline of the embodiment. FIG. 1B illustrates an (a second) outline of the embodiment. The (first) outline of the embodiment illustrated in FIG. 1A is to overcome the (first) disadvantage of the related art illustrated in FIG. 12A.

First, referring to FIG. 1A, (1) the MW of the FCMDB registers a piece of device configuration information of the MDR 1 managed by the MW 1 on the FCMDB. As illustrated in FIG. 1A, the piece of device configuration information of the MDR 1 is a piece of device configuration information indicating that "Server A has components in order of CPU 1, CPU 2, and CPU 3".

(2) Next, the MW registers a piece of device configuration information of the MDR 2 managed by the MW 2 on the FCMDB. As illustrated in FIG. 1A, the piece of device configuration information of the MDR 2 is a piece of device configuration information indicating that "Server A has components in order of CPU 2 and CPU 1".

In this case, the MW registers the piece of device configuration information of the MDR 2 managed by the MW 2 on the FCMDB according to a process policy indicating that "at a class equal to or lower than a Server class, an unknown component is added to last of the device configuration integration information", which is previously defined as a process policy for registering the piece of device configuration information of the MDR 2.

(3) However, in the example illustrated in FIG. 1A, the MW of the FCMDB, which detects components overlapping with the registered data based on IDs or attribute information of the components included in the previously registered device configuration integration information, does not register the piece of device configuration information of the MDR 2, and adds only metadata that defines a data structure including order information of the data.

(4) When the MW 2 managing the MDR 2 reads the device configuration integration information from the FCMDB, the MW 2 reconstructs the piece of device configuration information of the MDR 2, according to the order information of the metadata registered in (2) of FIG. 1A and the predetermined process policy indicating that "at a class lower than or equal to a Server class, an unknown component is added to a last of the piece of device configuration information" as a process policy to reconstruct the piece of device configuration information.

Specifically, since the piece of device configuration information of the MDR 2 includes "order of CPU 1 and CPU 2" and the "CPU 3" is unknown in the MDR 2, the MW 2 reconstructs the piece of device configuration information indicating that "Server A has components in order of CPU 2, CPU 1, and CPU 3", according to the predetermined process policy indicating that "at a class lower than or equal to a Server class, an unknown component is added to last of the piece of device configuration information". Accordingly, the piece of device configuration information of the MDR 2 is read from the device configuration integration information and reconstructed in order expected by the MW 2.

Next, one example of the (second) outline of the embodiment will be described. FIG. 1B illustrates the (second) outline of the embodiment. The (second) outline of the embodiment illustrated in FIG. 1B is to overcome the (second) disadvantage of the related art illustrated in FIG. 12B.

Referring to FIG. 1B, (1) the MW of the FCMDB registers the piece of device configuration information of the MDR 1 managed by the MW 1 on the FCMDB. As illustrated in FIG. 1B, the piece of device configuration information of the MDR 1 is a piece of device configuration information indicating that "Server A has components in order of CPU 1 and Memory 1". The MW 1 managing the MDR 1 uses a conversion function to convert the piece of device configuration information so as to adapt to the schema of the FCMDB and transmits the piece of device configuration information to the MW of the FCMDB.

(2) Next, the MW registers the piece of device configuration information of the MDR 2 managed by the MW 2 on the FCMDB. As illustrated in FIG. 1B, the piece of device configuration information of the MDR 2 is a piece of device configuration information indicating that "Server A has components in order of CPU 1 and HDD 1". The MW 2 managing the MDR 2 uses a conversion function to convert the piece of device configuration information so as to adapt to the schema of the FCMDB and transmits the piece of device configuration information to the MW of the FCMDB.

In this case, the MW registers the piece of device configuration information of the MDR 2 managed by the MW 2 on the FCMDB according to a process policy indicating that "at a class lower than or equal to a Server class, data is inserted in a format of an MDR as a registration source", which is previously defined as a process policy for registering the piece of device configuration information of the MDR 2. Accordingly, the FCMDB has device configuration integration information indicating that "Server A has components in order of CPU 1, Memory 1, and HDD 1".

(3) When the client device reads the device configuration integration information from the FCMDB, (4) the MW requests the MW 2 managing the MDR 2 to inversely convert the device configuration integration information. As a result, a piece of device configuration information indicating that "Server A has components in order of CPU 1, uncertain component, and HDD 1" is obtained. That is, it can be seen that information, the detail of which is uncertain, is included after the CPU 1 and before the HDD 1 below the Server A.

(5) Further, when the NW requests the MW 1 managing the MDR 1 to perform an inverse conversion of the device configuration integration information on the piece of device configuration information indicating that "Server A has components in order of CPU 1, uncertain component, and HDD 1", it can be found that the "uncertain component" of the piece of device configuration information indicating that "Server A has components in order of the CPU 1, uncertain component, and HDD 1" is the "Memory 1". Accordingly, a piece of device configuration information indicating that "Server A has components in order of CPU 1, Memory 1, and HDD 1" is obtained.

Figure 2:
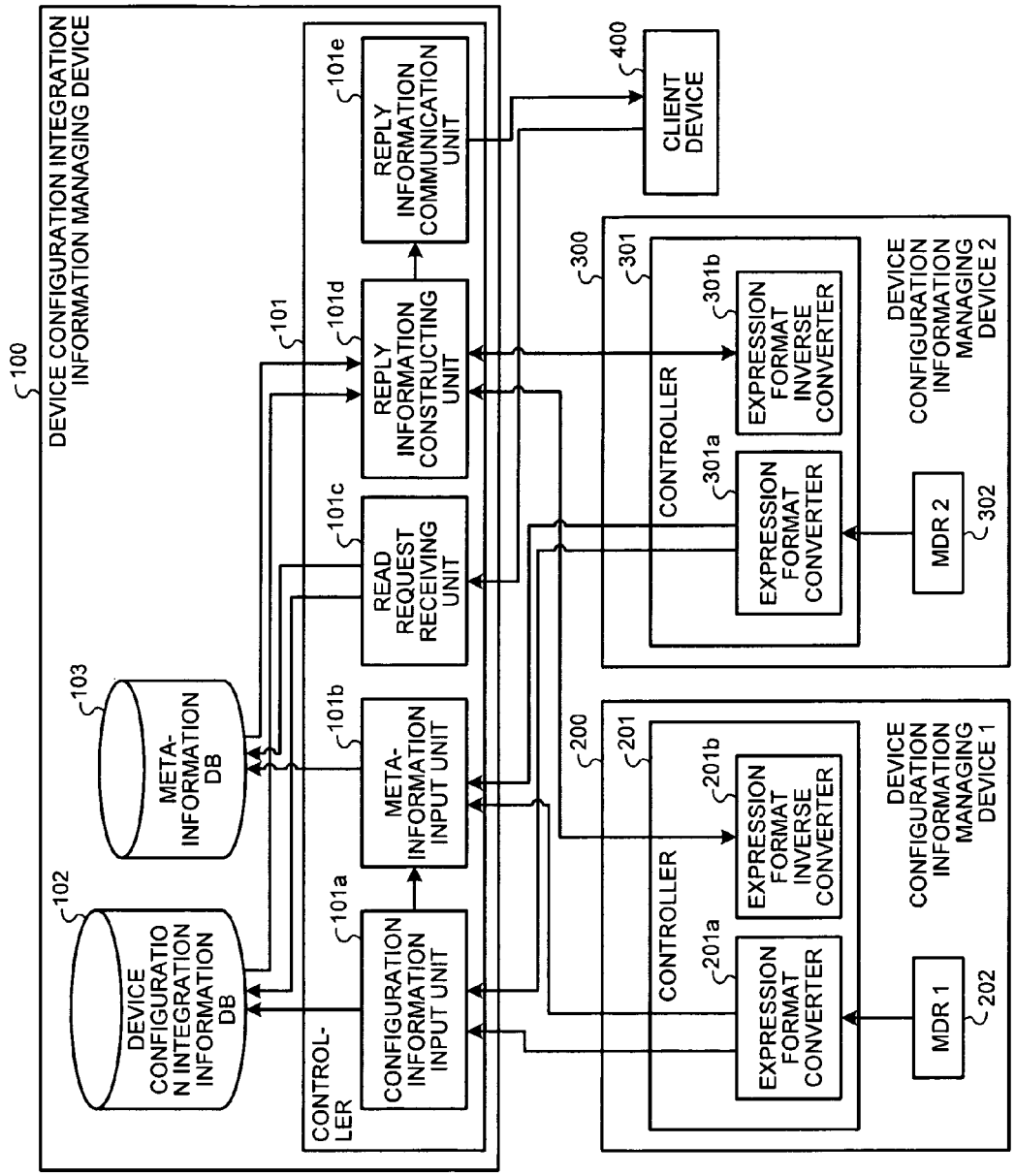
FIG. 2 is a block diagram illustrates the configuration of a device configuration integration information managing device according to the embodiment.

Next, a configuration of the device configuration integration information managing device according to an embodiment will be described. FIG. 2 is a block diagram illustrating the configuration of the device configuration integration information managing device according to the embodiment. As illustrated in FIG. 2, a device configuration integration information managing device 100 according to the embodiment is connected to a device configuration information managing device 1_200 and a device configuration information managing device 2_300 that can communicate with each other. The device configuration integration information managing device 100 is connected to a client device 400 that can communicate with each other.

The device configuration integration information managing device 100 according to the embodiment has a controller 101, a device configuration integration information DB (Database) 102, and a meta-information DB 103. The controller 101 is a controlling device that controls the entire device configuration integration information managing device 100, and executes middleware of the FCMDB to cause the device configuration integration information managing device 100 to function as the FCMDB.

The device configuration integration information DB 102 is a DB that stores device configuration integration information obtained by integrating pieces of device configuration information, which are collected from respective MDRs, in a device configuration integration information data table 102*a* exemplified in FIG. 3. The device configuration integration information data table 102*a* has columns of "data class", "data ID", and "attribute information", and integrates pieces of device configuration information of respective MDRs and manages the integrated device configuration information as device configuration integration information.

The device configuration integration information DB 102 is not limited to the device configuration integration information data table 102*a*. As exemplified in FIG. 4, the device configuration integration information DB 102 may manage the device configuration integration information in a format of an XML (eXtensible Markup Language).

The meta-information DB 103 stores a device configuration information registration source meta-information table 103*a* exemplified in FIG. 5, a document structure meta-information table 103*b* exemplified in FIG. 6, a document structure process policy meta-information table 103*c* exemplified in FIG. 7, and a different schema process policy meta-information table 103*d* exemplified in FIG. 8.

The device configuration information registration source meta-information table 103*a* stores information indicating which MDR has registered a component that is uniquely identified by a "data ID" in the device configuration integration information DB 102. As exemplified in FIG. 5, the device configuration information registration source meta-information table 103*a* has columns of "data ID" and "device configuration information registration source". Specifically, if the "data ID" is "Server_Bravo_A", it can be seen that the "device configuration information registration source" is the "MDR 1".

The document structure meta-information table 103*b* stores a relationship between two components ("data A" and "data B"), each of which is uniquely identified by a "data ID" in the device configuration integration information DB 102, in an MDR as a registration source. As exemplified in FIG. 6, the document structure meta-information table 103*b* has columns of a "device configuration information registration source", "data A", "data B", and "relationship of A→B".

Specifically, when the "device configuration information registration source" is the "MDR 1", it can be seen that, as a relationship between the "server A" corresponding to the component of the "data A" and the "CPU 1" corresponding to the component of the "data B", the "relationship of A→B" is a "child", that is, the "CPU 1" is a "child" of the "server A".

The document structure process policy meta-information table 103*c* stores a process policy on how to register the components included in the piece of device configuration information of the MDR as the registration source in the device configuration integration information DB 102 according to the MDR as the registration source and positions of the components in the case where the MDR as the registration source has the same schema as the FCMDB. The process policy of the registration is specified depending on the MDR as the registration source as exemplified in FIG. 7. The document structure process policy meta-information table 103*c* has columns of "process policy registration source", "data position", and "process policy".

Specifically, when the "process policy registration source" is the "MDR 1" and the "data position" is "right below the server A", the components included in the piece of device configuration information of the MDR as the registration source is registered on the device configuration integration information DB 102 to maintain the relationship of the components of the MDR 1 that was last registered, according to a process policy indicating that the "process policy" is to "maintain a relationship of the data that was last registered" referring to the document structure meta-information table 103*b*.

The different schema process policy meta-information table 103*d* stores a process policy on how to register the components included in the piece of device configuration information of the MDR as the registration source in the device configuration integration information DB 102 according to registration positions of the components and the MDR of the registration source in the case where the MDR as the registration source has a different schema from that of the FCMDB. The process policy of the registration is specified depending on the MDR as the registration source. The different schema process policy meta-information table 103*d* has columns of "process policy registration source", "data position", and "process policy", as exemplified in FIG. 8.

Specifically, when the "process policy registration source" is the "MDR 1" and the "data position" is "right below the server A", the different schema process policy meta-information table 103*d* discards the components included in the piece of device configuration information of the MDR as the registration source without registering the components in the device configuration integration information DB 102, according to a process policy indicating that "process policy" is "discarding".

The meta-information, such as the piece of device configuration information registration source meta-information, the document structure meta-information, the document structure process policy meta-information, and the different schema process policy meta-information may be managed in a table or in a data format having a hierarchical structure, such the XML.

The device configuration information managing device 1_200 has a controller 201 and an MDR 1_202. The controller 201 is a controlling device that controls the entire device configuration information managing device 1_200, and executes middleware of the CMDB to cause the device configuration information managing device 1_200 to function as the CMDB.

The controller 201 has an expression format converter 201*a* and an expression format inverse converter 201*b*, as components according to the embodiment. The device configuration information managing device 1_200 previously collects pieces of device configuration information of devices as device configuration information management targets managed by the device configuration information managing device 1_200 and registers the piece of device configuration information in the MDR 1_202.

Similar to the device configuration information managing device 1_200, the device configuration information managing device 2_300 has a controller 301 and an MDR 2_302. The controller 301 is a controlling device that controls the entire device configuration information managing device 2_300, and executes middleware of the CMDB to cause the device configuration information managing device 2_300 to function as the CMDB.

Similar to the controller 201, the controller 301 has an expression format converter 301a and an expression format inverse converter 301b, as the components according to the embodiment. Also, the device configuration information managing device 2_300 previously collects pieces of device configuration information of devices as device configuration information management targets managed by the device configuration information managing device 2_300 and registers the piece of device configuration information in the MDR 2_302.

The controller 101 of the device configuration integration information managing device 100 has a configuration information input unit 101a, a meta-information input unit 101b, a read request receiving unit 101c, a reply information constructing unit 101d, and a reply information communication unit 101e, as components according to the embodiment.

The configuration information input unit 101a acquires pieces of device configuration information of the MDR 1_202 and the MDR 2_302 which are converted to have the expression format so as to adapt to the common data model of the FCMDB, from the expression format converter 201a of the device configuration information managing device 1_200 and the expression format converter 301a of the device configuration information managing device 2_300.

The configuration information input unit 101a divides the acquired pieces of device configuration information of the MDR 1_202 and the MDR 2_302 into management units, according to a process policy defined in the document structure process policy meta-information table 103c, and registers the pieces of device configuration information in the device configuration integration information DB 102. At this time, in the pieces of device configuration information, if the "data ID" and the "attribute information" of components in the device configuration integration information are same in each of the management unit, one of them is not registered to avoid overlapping.

The configuration information input unit 101a transmits configuration information registration source meta-information as unique identification information of the MDR (MDR 1_202 and/or the MDR 2_302) as the registration source of the component of the management units, into which the acquired pieces of device configuration information of the MDR 1_202 and the MDR 2_302 are divided, to the meta-information input unit 101b together with a "data ID" as a unique identification information of a component of the management unit.

The configuration information input unit 101a transmits pieces of document structure meta-information before the acquired pieces of device configuration information of the MDR 1_202 and the MDR 2_302 are divided into the management units, to the meta-information input unit 101b. The pieces of document structure meta-information are information indicating a relationship between two components ("data A" and "data B"), each of which is uniquely identified by a "data ID" in the MDR as the registration source, in the device configuration integration information DB 102.

The meta-information input unit 101b acquires pieces of document structure meta-information of the pieces of device configuration information of respective MDRs before the expression, format is converted by the expression format converter 201a and the expression format converter 301a, and registers the pieces of document structure meta-information in the meta-information DB 103.

The meta-information input unit 101b registers the pieces of document structure meta-information before the configuration information registration source meta-information and pieces of device configuration information are divided into the management units, which is received from the configuration information input unit 101a, in the meta-information DB 103.

The read request receiving unit 101c receives a read request of the device configuration integration information from the client device 400 with the MDR and the component specified, and refers to the device configuration integration information DB 102 and the meta-information DB 103 in response to the read request. The reference result is output to the reply information constructing unit 101d.

The reply information constructing unit 101d constructs reply information to reply to the client device 400, based on the device configuration integration information and the variety of meta-information acquired from the device configuration integration information DB 102 and the meta-information DB 103.

Specifically, the reply information constructing unit 101d searches a component corresponding to a "child" of the component of the MDR specified by the client device 400 referring to the document structure meta-information table 103b, and constructs reply information on components corresponding to respective "children". The reply information constructing unit 101d then reconstructs the reply information that is constructed with respect to the components corresponding to respective "children", according to order of the respective "children" defined in the document structure meta-information table 103b and the process policy defined in the document structure process policy meta-information table 103c.

The reply information constructing unit 101d requests the expression format inverse converter 201b of the MW of the specified MDR (or the expression format inverse converter 301b) to inversely convert the expression format of the reconstructed reply information into an expression format of the specified MDR. If the inverse conversion of the expression format of the reply information is succeeded, the reply information constructing unit 101d adds reply information indicating that the inverse conversion is succeeded to final reply information.

On the other hand, if the inverse conversion of the expression format of the reply information is not succeeded, the reply information constructing unit 101d executes a process of "discarding of the reply information" or "requesting the inverse conversion to the device configuration information registration source" according to the different schema process policy for the specified MDR while referring to the different schema process policy meta-information table 103d.

By the above process, the reply information is discarded, the expression format thereof is inversely converted by the expression format inverse converter 201b of the MW of the MDR of the device configuration information registration source (or the expression format inverse converter 301b), or the piece of uncertain device configuration information is included as it is without inversely converting the expression format thereof. The reply information, which is not discarded, is added to the final reply information.

The reply information constructing unit 101d constructs a piece of reply information with respect to each of all "children" and all "children" of "children" of the components of the MDR specified by the client device 400, and sequentially adds the piece of reply information to the final reply information. If the reply information constructing unit 101d completes construction of all pieces of the reply information, the reply information constructing unit 101d transmits the final reply information to the reply information communication unit 101e. The reply information communication unit 101e outputs the final reply information to the client device 400.

Figure 9:
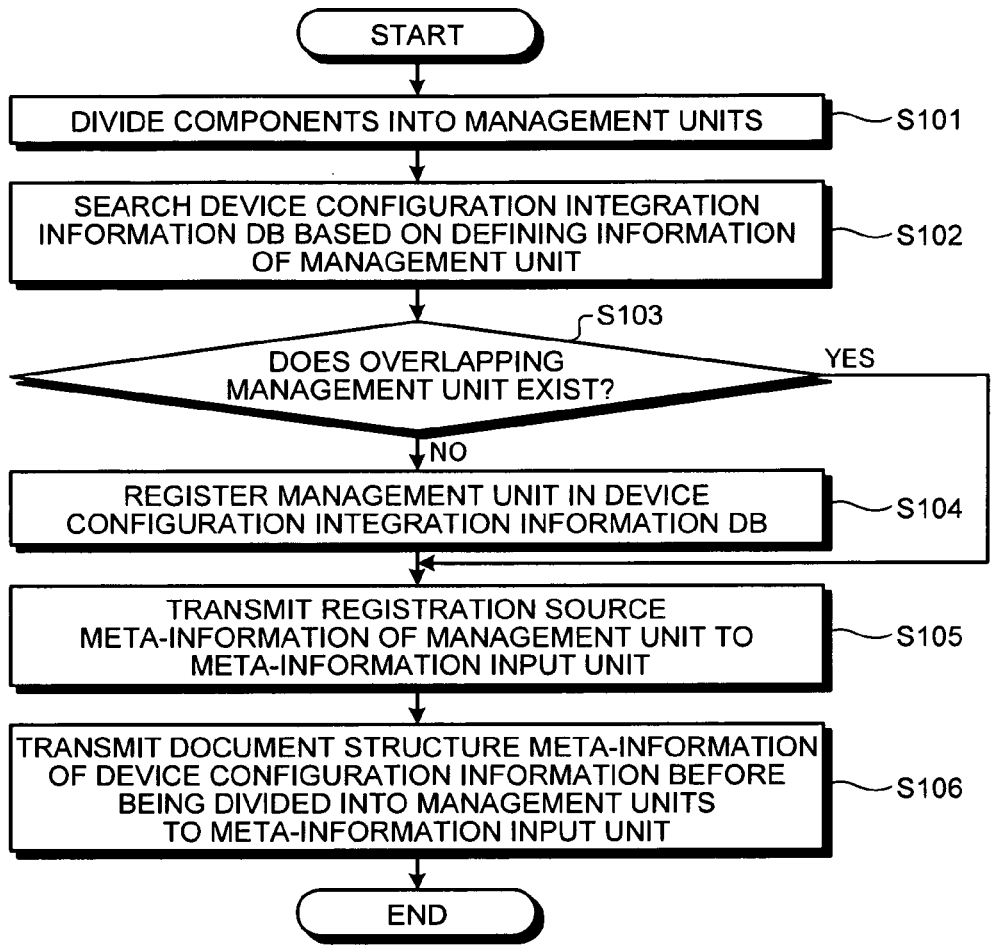
FIG. 9 is a flowchart illustrating a device configuration information input process step according to the embodiment.

Next, a device configuration information input process according to the embodiment will be described. FIG. 9 is a flowchart illustrating a device configuration information input process step according to the embodiment. As illustrated in FIG. 9, first, the configuration information input unit 101a divides the components included in each of the pieces of the device configuration information acquired from each MDR, into management units (S101).

Next, the configuration information input unit 101a searches the device configuration integration information DB 102, based on pieces of defining information of the management units (for example, "data IDs" corresponding to pieces of identification information of the components or pieces of "attribute information") (S102).

Next, the configuration information input unit 101a determines whether an overlapping management unit exists in the device configuration integration information DB 102 (S103). If it is determined that an overlapping management unit exists in the device configuration integration information DB 102 (S103: YES), the process proceeds to step S105. On the other hand, if it is not determined that an overlapping management unit exists in the device configuration integration information DB 102 (S103: NO), the process proceeds to step S104.

In step S104, the configuration information input unit 101a registers the management unit in the device configuration integration information DB 102. Next, in step S105, the configuration information input unit 101a transmits a piece of registration source meta-information of the management unit to the meta-information input unit 101b.

Next, the configuration information input unit 101a transmits the pieces of document structure meta-information of the piece of device configuration information before being divided into the management units to the meta-information input unit 101b (S106). When this process ends, the device configuration information input process ends.

Figure 10:
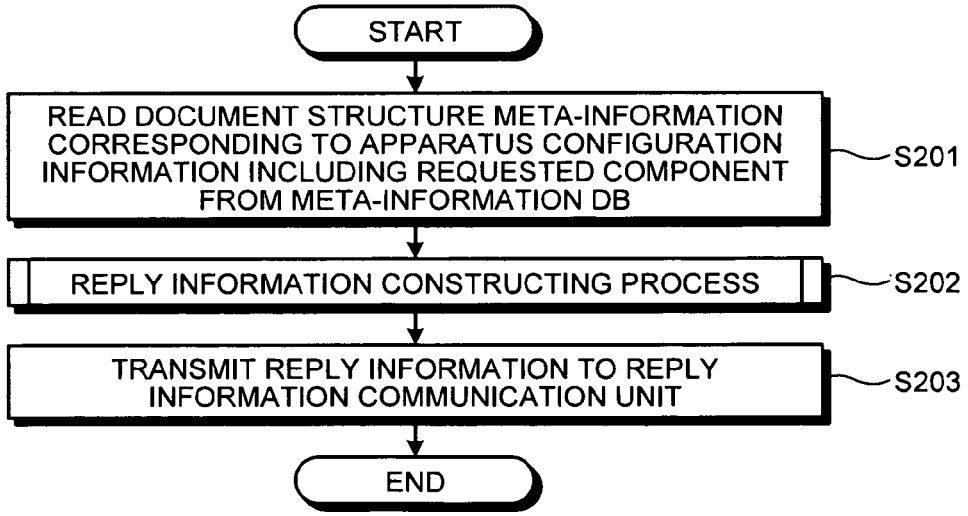
FIG. 10 is a flowchart illustrating a reply information constructing process step according to the embodiment.

Next, a reply information constructing process according to the embodiment will be described. FIG. 10 is a flowchart illustrating a reply information constructing process step according to the embodiment. As illustrated in FIG. 10, first, the reply information constructing unit 101d acquires a piece of document structure meta-information corresponding to a piece of device configuration information including a specified component, which is requested by the client device 400 running on the MW managing the MDR, from the meta-information DB 103 (S201).

Next, the reply information constructing unit 101d executes a reply information constructing process to construct a piece of reply information with respect to the specified component (S202). The reply information constructing process will be described in detail below with reference to FIG. 11. A subroutine of the reply information constructing process is a recursive program with the specified component as an input and the piece of reply information as an output.

Next, the reply information constructing unit 101d transmits the reply information with respect to the piece of device configuration information, which is requested to be read, to the reply information communication unit 101e (S203). When this process ends, the reply information constructing process ends.

Figure 11:
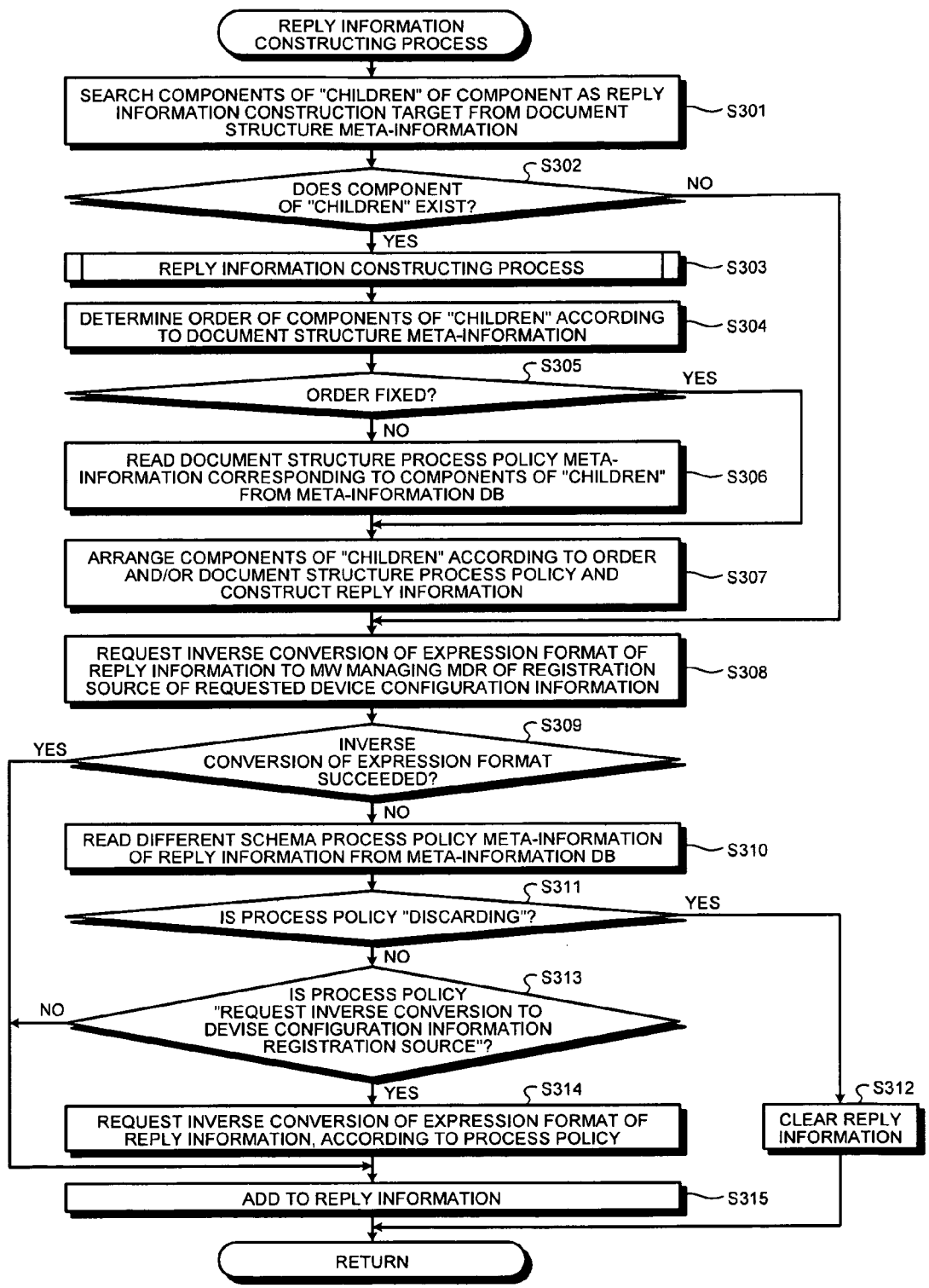
FIG. 11 is a flowchart illustrating a reply information constructing process step according to the embodiment.

Next, the reply information constructing process that is executed in step S202 of the reply information constructing process illustrated in FIG. 10 will be described in detail. FIG. 11 is a flowchart illustrating a reply information constructing process step according to the embodiment. As illustrated in FIG. 11, first, the reply information constructing unit 101d searches components of "children" of the reply information construction target (specified component) from the document structure meta-information (S301). At this time, a device configuration information registration source in each column of the document structure meta-information is not used for search refinement.

Next, the reply information constructing unit 101d determines whether each of the components as the "children" of the reply information construction target exists in the document structure meta-information (S302). When it is determined that the component as a "child" of the reply information construction target exists in the document structure meta-information (S302: YES), the process proceeds to step S303. On the other hand, when it is not determined that the component as the "child" of the reply information construction target exists in the document structure meta-information (S302: NO), the process proceeds to step S308.

In step S303, using the component as a "child" determined to exist in step S302 as an input, the reply information constructing unit 101d recursively calls the subroutine of the reply information constructing process and executes the subroutine. By recursively executing the subroutine of the reply information constructing process, the reply information constructing unit 101d constructs pieces of reply information for all the components in a parent-child relationship while constructing those of each order in the hierarchy starting from the lowest target hierarchy to the highest target hierarchy, and sequentially adds the pieces of reply information to the final reply information.

Next, the reply information constructing unit 101d determines order of the components as the "children", based on the piece of document structure meta-information (S304). At this time, among the columns of the document structure meta-information, only columns having the device configuration registration source same as the device configuration information registration source requested by the reply information constructing process are used. Next, the reply information constructing unit 101d determines whether the order of the components as the "children" is fixed (S305). When it is determined that the order of the components as the "children" is fixed (S305: YES), the process proceeds to step S307. When it is not determined that the order of the components as the "children" is fixed (S305: NO), the process proceeds to step S306.

In step S306, the reply information constructing unit 101d reads a piece of document structure process policy meta-information corresponding to the components as the "children" where the order thereof is not fixed, from the meta-information DB 103. At this time, the reply information constructing unit 101d uses, among the columns of the document structure process policy meta-information, only columns having the device configuration information registration source same as the device configuration information registration source requested by the reply information constructing process are used. Next, in step S307, the reply information constructing unit 101d arranges the components of the "children" according to the fixed order and/or the document structure process policy and constructs the reply information.

Next, in step S308, the reply information constructing unit 101d requests the MW managing the MDR of the registration source of the requested expression format to perform an expression format inverse conversion of the piece of reply information. Next, the reply information constructing unit 101d determines whether the expression format inverse conversion of the piece of reply information is succeeded (S309). When it is determined that the expression format inverse conversion of the piece of reply information is succeeded (S309: YES), the process proceeds to step S315. On the other hand, when it is not determined that the expression format inverse conversion of the piece of reply information is succeeded (S309: NO), the process proceeds to step S310.

In step S310, the reply information constructing unit 101d reads different schema process policy meta-information of the piece of reply information from the meta-information DB 103. At this time, the reply information constructing unit 101d uses, among the columns of the different schema process policy meta-information, only columns having the process policy registration source same as the device configuration information registration source requested by the reply information constructing process are used. Next, the reply information constructing unit 101d determines whether the different schema process policy is "discarding" (S311). When it is determined that the different schema process policy is "discarding" (S311: YES), the process proceeds to step S312. On the other hand, when it is not determined that the different schema process policy is "discarding" (S311: NO), the process proceeds to step S313.

In step S312, the reply information constructing unit 101d clears only the pieces of reply information that are constructed in this reply information constructing process. On the other hand, in step S313, the reply information constructing unit 101d determines whether the process policy is "requesting the device configuration information registration source to perform the inverse conversion".

When it is determined that the process policy is "requesting the device configuration information registration source to perform the inverse conversion" (S313: YES), the process proceeds to step S314, whilst when it is not determined that the process policy is "requesting the device configuration information registration source to perform the inverse conversion" (S313: NO), the process proceeds to step S315.

In step S314, the reply information constructing unit 101d requests MW of another device configuration information managing device different from the requested device configuration information registration source to perform the inverse conversion of the expression format of the reply information, according to the process policy. Next, the reply information constructing unit 101d adds the pieces of reply information constructed in the reply information constructing process to the reply information (S315). When this process ends, the process returns to the reply information constructing process.

The embodiment described above can be summarized as follows. In the embodiment, the meta-information (specifically, meta-information of a parent-child relationship and an order of the components in each of the pieces of device configuration information before integration and meta-information on an MDR of a device configuration information managing device which has provided each of the pieces of device configuration information before the integration and pieces meta-information thereof) is added to the common data model of the device configuration integration information.

With such a process, when a piece of device configuration integration information is read, the structure and the expression format of each of the pieces of device configuration information before the integration can be reproduced using the pieces of meta-information. Depending on which expression format of the MW of the MDR is specified by the reading side, pieces of meta-information to be used for reproduction are determined. Even in the read from a client specifying the expression format of an MW managing an MDR different from the MW managing the MDR, it is possible to comply with a reply for a request to read the piece of device configuration information in the same structure and expression format as the MDR because a plurality of pieces of meta-information can be applied in order of application priority.

In addition, with respect to data where the structure thereof is not specified by meta-information, process options (document structure process policy meta-information) are provided. For example, as illustrated in FIG. 1A, with respect to the CPU 3 that is registered by the MDR 1, process options of: "add to last", "add to top", or "maintain before-after relationship with the immediately previous data" are provided. In this case, the process options (document structure process policy meta-information) may be previously provided by the MW managing the MDR of the registration source of the piece of device configuration information or specified by the reading client.

The specification by the reading side, for example, the specification of the requested component is dynamically determined. The piece of device configuration information that is stored in the MDR and the device configuration integration information that is stored in the FCMDB are dynamically changed.

According to the embodiment, with respect to a process in the case where data (component) of a kind that does not exist in the request schema of the reading side exists, process options (different schema process policy meta-information) are provided. For example, the choices may be the data of the kind that does not exist in the request schema of the reading side is "discarded", "buried in the expression format of the common data model" or "inversely converted into an expression format of the MDR corresponding to the registration source of the piece of device configuration information and buried".

The inverse conversion process of the expression format is requested to the MW managing the MDR corresponding to the registration source of the piece of device configuration information. For example, while preventing the data from being mixed up by separating the data using a name space of the XML, the inverse conversion process result of the expression format can be buried in the request schema of the reading side.

The data (component) of the kind that does not exist in the request schema of the reading side may be buried in the request schema using a reference. For example, the reference may specify the data of the FCMDB, or data of the MDR corresponding to the registration source.

The process options of in the case where the data (component) of the kind that does not exist in the request schema of the reading side exists are previously provided by the MW managing the MDR corresponding to the registration source of the piece of device configuration information. The process options may be specified by the reading side.

Upon determining process in the case where the data (component) of the kind that does not exist in the request schema of the reading side exists, the hierarchical structure of the data is used. Specifically, as a process policy of the corresponding component, a process policy of a parent of the corresponding component is used. As a process policy of a class of the corresponding component, a process policy of a parent of the class of the corresponding component is used.

The embodiment has been described, but is only exemplary, and a variety of different embodiments may be carried out within a range of a technical spirit defined in claims. In addition, the effect that is described in the embodiment is not limited thereto.

All or part of the process that is described to be automatically executed in the embodiment can be manually executed, or all or part of the process that is described to be manually executed can be automatically executed using a known method. Moreover, for example, the process step, the control step, the specific names, and the information including various data or parameters that are described in the embodiment may be arbitrarily changed, unless specifically mentioned.

The components of each of the devices that are illustrated in the drawings are functional concepts, and it is not necessary to be physically configured as illustrated in the drawings. That is, the specific form of separation and integration of each of the devices is not limited to the form illustrated in the drawings, and all or part thereof may be functionally or physically separated or integrated to make arbitrary units according to the loads of the various processes or the use situations.

All or arbitrary part of the process functions that are performed by each of the devices may be realized by a CPU (Central Processing Unit) (or a microcomputer, such as an MPU (Micro Processing Unit) and an MCU (Micro Controller Unit)) and a program analyzed and executed by the CPU (or the microcomputer, such as the MPU and the MCU), or realized as hardware based on wired logic.

According to an embodiment, the pieces of the device configuration information converted to have an expression format of the device configuration integration information are registered in the device configuration integration information based on the meta-information of the device configuration integration information, and the registration source meta-information and a piece of document structure meta-information of each of the pieces of device configuration information and the document structure meta-information of the pieces of device configuration information before the expression format is converted are acquired, and the pieces of information are registered in the meta-information of the device configuration integration information. Therefore, when the pieces of device configuration information are extracted from the device configuration integration information, the pieces of device configuration information can be extracted while maintaining the original data structure and expression format of the piece of device configuration information.

According to an embodiment, each of the pieces of the device configuration information having the converted expression format is divided into management units and each of the management units into which the piece of device configuration information is divided is registered in the device configuration integration information only when no management unit having a defining information same as that of the management unit exists in the device configuration integration information, the piece of device configuration information that is divided into the management units are registered in the device configuration integration information, the piece of document structure meta-information of the piece of device configuration information before being divided into the management units is acquired, and the piece of document structure meta-information is registered in the meta-information. Therefore, overlapping registration of the management units can be avoided, and the piece of device configuration information before being divided into the management units can be restored.

According to an embodiment, the piece of device configuration information including the requested component is constructed as the piece of reply information for replying to the terminal device based on the piece of document structure meta-information corresponding to the device configuration information including the requested component. Therefore, the terminal device can extract the piece of device configuration information from the device configuration integration information in the desired expression format.

According to an embodiment, when the sub-component right below the requested component in the hierarchical structure is searched, the sub-component right below the requested component is defined to be the requested component and the piece of document structure meta-information corresponding to the piece of device configuration information including the requested component is acquired from the meta-information of the device configuration integration information. Therefore, the hierarchical structure is searched downwardly and the device configuration information including respective requested components are constructed sequentially from the lowest target hierarchy, whereby the reply information can be constructed.

According to an embodiment, when the order of all of the sub-components right below the requested component in the hierarchical structure is not fixed, the piece of document structure process policy meta-information corresponding to any of the sub-components whose order is not fixed is acquired, and the reply information is constructed based on the order of the sub-components where the order is fixed in the component order determining step and/or the document structure process policy meta-information. Therefore, the reply information where the order of all the components is fixed can be constructed.

According to an embodiment, inverse conversion of the expression format of the device configuration information including the requested component constructed as the reply information into the expression format of the device configuration information in the device configuration information managing device is requested to the device configuration information managing device of the registration source of the requested component. Therefore, the terminal device can refer to the piece of device configuration information that is extracted from the device configuration integration information in the desired expression format.

According to an embodiment, when the inverse conversion of the expression format of the piece of device configuration information including the requested component into the expression format of the device configuration information in the device configuration information managing device is not succeeded, the reply information is constructed based on the different schema process policy meta-information that defines the process policy executed when the schema of the device configuration information is different. Therefore, even though the schema of the piece of device configuration information is different, the reply information can be constructed.

According to an embodiment, the piece of device configuration information including the requested component is added to the reply information or the piece of device configuration information including the requested component is not added to the reply information, according to the different schema process policy meta-information. Therefore, even though the schema of the device configuration information is different, the reply information can be constructed.

According to an embodiment, based on the different schema process policy meta-information that is acquired by the different schema process policy meta-information acquiring unit, inverse conversion of the expression format of the piece of device configuration information including the requested component constructed as the reply information for replying to the terminal device by the reply information constructing unit into the expression format of the piece of device configuration information in another device configuration information managing device is requested to the another device configuration information managing device different from the registration source of the requested component. Therefore, even though the schema of the piece of device configuration information is different, the reply information can be constructed, and the terminal device can refer to the piece of device configuration information that is extracted from the device configuration integration information in the desired expression format.

According to an embodiment, upon the request from the device configuration integration information managing device, the expression format of the piece of device configuration information is converted into the expression format of the device configuration integration information in the device configuration integration information managing device or the expression format of the device configuration integration information is inversely converted into the expression format of the piece of device configuration information in the device configuration information managing device. Therefore, even though the expression format of the piece of device configuration integration information in the device configuration integration information managing device is different from the expression format of the piece of device configuration information in the device configuration information managing device, the pieces of device configuration information can be integrated into the device configuration integration information and the pieces of device configuration information can be extracted from the device configuration integration information while maintaining the expression format.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer readable storage medium having stored therein a device configuration integration information managing program for causing a computer to execute a device configuration integration information managing process for acquiring pieces of device configuration information having a hierarchical structure and including components of devices managed by a plurality of device configuration information managing devices and relationships between the components and from the plurality of device configuration information managing devices, integrating the pieces of device configuration information into device configuration integration information, and managing the device configuration integration information, the device configuration integration information managing program causing the computer to execute a process comprising:

acquiring the device configuration information having an expression format converted into that of the device configuration integration information;

registering the pieces of device configuration information in the device configuration integration information, based on meta-information of the device configuration integration information;

acquiring a piece of registration source meta-information and a piece of document structure meta-information of each of the pieces of device configuration information where the expression format thereof is converted and a piece of document structure meta-information of the device configuration information before the expression format is converted, and registering the pieces of information in the meta-information of the device configuration integration information.

2. The computer readable storage medium according to claim 1, further comprising dividing each of the acquired pieces of device configuration integration information having the converted expression format into management units, wherein the registering the device configuration integration information includes registering each of the management units into which the piece of device configuration information is divided in the device configuration integration information only when no management unit having a defining information same as that of the management unit exists in the piece of device configuration integration information, and the acquiring the piece of registration source meta-information and a piece of document structure meta-information includes acquiring the piece of document structure meta-information of the piece of device configuration information before being divided into the management units, to register the piece of document structure meta-information.

3. The computer readable storage medium according to claim 1, wherein the meta-information of the device configuration integration information further includes document structure process policy meta-information that defines a process policy used when the device configuration information is read.

4. The computer readable storage medium according to claim 1, further comprising:

receiving, from a terminal device, an inquiry specifying a requested component for inquiring a piece of device configuration information including the requested component;

acquiring a piece of document structure meta-information corresponding to the piece of device configuration information including the requested component from the pieces of meta-information of the device configuration integration information when the inquiry of the piece of device configuration information including the requested component is received at the receiving; and constructing a piece of device configuration information including the requested component as a piece of reply information for replying to the terminal device, based on the acquired piece of document structure meta-information when the piece of document structure meta-information corresponding to the piece of device configuration information including the acquired requested component.

5. The computer readable storage medium according to claim 4, wherein the constructing includes searching sub-components right below the requested component in the hierarchical structure, based on the piece of document structure meta-information corresponding to the piece of device configuration information including the acquired requested component, and when a sub-component right below the requested component in the hierarchical structure is searched at the searching, the acquiring the piece of document structure meta-information includes defining the sub-component right below the requested component to be the requested component, and acquiring a piece of document structure meta-information corresponding to a piece of device configuration information including the requested component from the meta-information of the device configuration integration information.

6. The computer readable storage medium according to claim 4, wherein the process to be executed by the computer further comprising:
   determining order of all of the sub-components right below the requested component in the hierarchical structure searched at the searching; and
   acquiring a piece of document structure process policy meta-information corresponding to any of the sub-components whose order is not fixed from the pieces of meta-information of the device configuration integration information if the order of all of the sub-components right below the requested component in the hierarchical structure searched at the searching is not fixed at the determining,
   wherein the constructing includes constructing the reply information, based on at least one of the order of the sub-components fixed at the determining and the acquired document structure process policy meta-information.

7. The computer readable storage medium according to claim 4, the process to be executed by the computer further comprising:
   requesting the device configuration information managing device as a registration source of the requested component to inversely convert the expression format of the piece of device configuration information including the requested component and constructed as the reply information for replying to the terminal device at the constructing into the expression format of the piece of device configuration information in the device configuration information managing device.

8. The computer readable storage medium according to claim 7,
   wherein when the inverse conversion of the expression format of the piece of device configuration information including the requested component into the expression format of the device configuration information in the device configuration information managing device, which is requested at the requesting, is not succeeded, the piece of meta-information of the piece of device configuration integration information further includes different schema process policy meta-information that defines a process policy executed when a schema of the piece of device configuration information is different, and
   the constructing includes constructing the reply information, according to the different schema process policy meta-information.

9. The computer readable storage medium according to claim 8,
   wherein the constructing includes adding the piece of device configuration information including the requested component to the reply information or not adding the piece of device configuration information including the requested component to the reply information, according to the different schema process policy meta-information.

10. The computer readable storage medium according to claim 8,
    wherein the requesting includes requesting another device configuration information managing device different from the registration source of the requested component to inversely convert the expression format of the piece of device configuration information including the requested component constructed as the reply information for replying to the terminal device at the constructing into the expression format of the piece of device configuration information in the another device configuration information managing device, according to the different schema process policy meta-information.

11. A computer readable storage medium having stored therein a device configuration information managing program for causing a computer to execute a device configuration information managing process for managing pieces of device configuration information having a hierarchical structure and including components of devices as device configuration information management targets and a relationship between the components, being integrated into device configuration integration information and managed in a device configuration integration information managing device, the device configuration information managing program causing the computer to execute a process comprising:
    converting the expression format of each of the pieces of device configuration information into the expression format of the device configuration integration information in the device configuration integration information managing device;
    transmitting the pieces of information to the device configuration integration information managing device;
    inversely converting the expression format of the device configuration integration information received from the device configuration integration information managing device into the expression format of each of pieces of the device configuration information in each of the device configuration information managing devices; and
    transmitting the information to the device configuration integration information managing device.

12. A device configuration integration information managing device for acquiring pieces of device configuration information having a hierarchical structure and including components of devices managed by a plurality of device configuration information managing devices and a relationship between the components from the plural device configuration information managing devices, integrating the pieces of device configuration information into device configuration integration information, and managing the device configuration integration information, the device configuration integration information managing device comprising:
    a device configuration integration information storing and managing unit that stores and manages the device configuration integration information;
    a meta-information storing and managing unit that stores and manages the plurality of pieces of device configuration information and meta-information of the device configuration integration information;
    a device configuration information acquiring and registering unit that acquires the device configuration information having an expression format converted into that of the device configuration integration information and registers the pieces of device configuration information in the device configuration integration information storing and managing unit; based on the meta-information of the device configuration integration information stored and managed by the meta-information storing and managing unit; and
    a meta-information registering unit that acquires a pieces of registration source meta-information and a piece of document structure meta-information of each of the pieces of device configuration information where the expression format thereof is converted and a piece of document structure meta-information of the device configuration information before the expression format is converted and registers the pieces of information in the meta-information storing and managing unit.

13. The device configuration integration information managing device according to claim 12,
wherein the device configuration information acquiring and registering unit divides each of the acquired pieces of device configuration integration information having the converted expression format into management units, and registers each of the management units into which the piece of device configuration information is divided in the device configuration integration information only when no management unit having a defining information same as that of the management unit exists in the piece of device configuration integration information, and
the meta-information registering unit acquires the piece of document structure meta-information of the piece of device configuration information before being divided into the management units, and registers the piece of document structure meta-information in the meta-information of the device configuration integration information.

14. The device configuration integration information managing device according to claim 12,
wherein the meta-information storing and managing unit further stores and manages document structure process policy meta-information that defines a process policy used when the device configuration information is read.

15. The device configuration integration information managing device according to claim 12, further comprising:
a device configuration information inquiry receiving unit that receives, from a terminal device, an inquiry specifying a requested component for inquiring a piece of device configuration information including the requested component;
a document structure meta-information acquiring unit that acquires a piece of document structure meta-information corresponding to the piece of device configuration information including the requested component from the meta-information storing and managing unit when the inquiry of the piece of device configuration information including the requested component is received by the device configuration information inquiry receiving unit; and
a reply information constructing unit that constructs a piece of device configuration information including the requested component as a piece of reply information for replying to the terminal device, based on the piece of document structure meta-information corresponding to the piece of device configuration information including the requested component acquired by the document structure meta-information acquiring unit.

16. The device configuration integration information managing device according to claim 15,
wherein the reply information constructing unit includes a sub-component searching unit that searches sub-components right below the requested component in the hierarchical structure, based on the piece of document structure meta-information corresponding to the piece of device configuration information including the requested component acquired by the document structure meta-information acquiring unit, and
when a sub-component right below the requested component in the hierarchical structure is searched by the sub-component searching unit, the document structure meta-information acquiring unit defines the sub-component right below the requested component to be the requested component, and acquires a piece of document structure meta-information corresponding to a piece of device configuration information including the requested component from the meta-information storing and managing unit.

17. The device configuration integration information managing device according to claim 15, further comprising:
a component order determining unit that determines order of all of the sub-components right below the requested component in the hierarchical structure searched by the sub-component searching unit; and
a document structure process policy meta-information acquiring unit that acquires a piece of document structure process policy meta-information corresponding to any of the sub-components whose order is not fixed from the meta-information storing and managing unit if the order of all of the sub-components right below the requested component in the hierarchical structure searched by the sub-component searching unit is not fixed by the component order determining unit,
wherein the reply information constructing unit constructs the reply information, based on at least one of the order of the sub-components fixed by the component order determining unit and the document structure process policy meta-information acquired by the document structure process policy meta-information acquiring unit.

18. The device configuration integration information managing device according to claim 15, further comprising:
an expression format inverse conversion requesting unit that requests the device configuration information managing device as a registration source of the requested component to inversely convert the expression format of the piece of device configuration information including the requested component and constructed as the reply information for replying to the terminal device by the reply information constructing unit into the expression format of the piece of device configuration information in the device configuration information managing device.

19. The device configuration integration information managing device according to claim 18,
wherein when the inverse conversion of the expression format of the piece of device configuration information including the requested component into the expression format of the device configuration information in the device configuration information managing device, which is requested by the expression format inverse conversion requesting unit, is not succeeded, the meta-information storing and managing unit further stores and manages different schema process policy meta-information that defines a process policy executed when a schema of the piece of device configuration information is different, and
the reply information constructing unit constructs the reply information, according to the different schema process policy meta-information.

20. The device configuration integration information managing device according to claim 19,
wherein the reply information constructing unit adds the piece of device configuration information including the requested component to the reply information or does not adds the piece of device configuration information including the requested component to the reply information, according to the different schema process policy meta-information.

21. The device configuration integration information managing device according to claim 19, wherein the expression format inverse conversion requesting unit requests another device configuration information managing device different from the registration source of the requested component to inversely convert the expression format of the piece of device configuration information including the requested component constructed as the reply information for replying to the terminal device by the reply information constructing unit into the expression format of the piece of device configuration information in the another device configuration information managing device, according to the different schema process policy meta-information.

22. A device configuration information managing device for managing pieces of device configuration information having a hierarchical structure and including components of devices as device configuration information management targets and a relationship between the components, being integrated into device configuration integration information and managed in a device configuration integration information managing device, the device configuration information managing device comprising:

an expression format conversion unit that converts the expression format of each of the pieces of device configuration information into the expression format of the device configuration integration information in the device configuration integration information managing device and transmits the pieces of information to the device configuration integration information managing device; and an expression format inverse conversion unit that inversely converts the expression format of the device configuration integration information received from the device configuration integration information managing device into the expression format of each of pieces of the device configuration information in each of the device configuration information managing devices, and transmits the information to the device configuration integration information managing device.

* * * * *

UNITED STATES PATENT AND TRADEMARK OFFICE
CERTIFICATE OF CORRECTION

Page 1 of 1

PATENT NO.        : 8,037,209 B2
APPLICATION NO.   : 12/805456
DATED             : October 11, 2011
INVENTOR(S)       : Kenji Morimoto et al.

It is certified that error appears in the above-identified patent and that said Letters Patent is hereby corrected as shown below:

ON THE TITLE PAGE:
Item (56) References Cited

Column 2 (Other Documents), Line 7, Delete ""CMBD" and insert -- "CMDB --, therefor.

Column 2 (Other Documents), Line 8, Delete "CMBD" and insert -- CMDB --, therefor.

IN THE CLAIMS:
Column 22, Line 57, In Claim 12, delete "unit;" and insert -- unit, --, therefor.

Signed and Sealed this
Thirty-first Day of January, 2012

David J. Kappos
*Director of the United States Patent and Trademark Office*